Feb. 9, 1937. S. L. MILLER ET AL 2,070,445
PARKING METER
Filed July 30, 1936 4 Sheets-Sheet 1
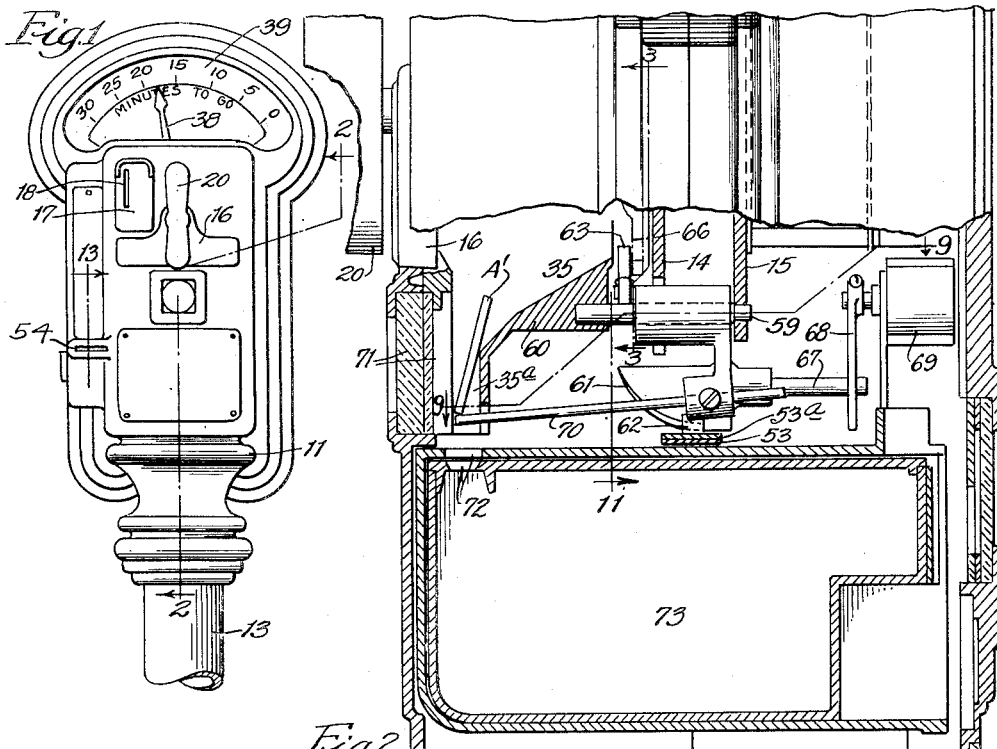
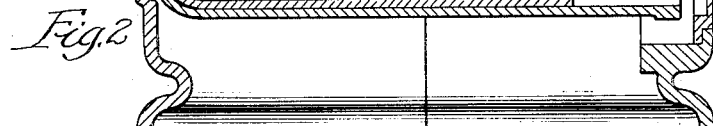
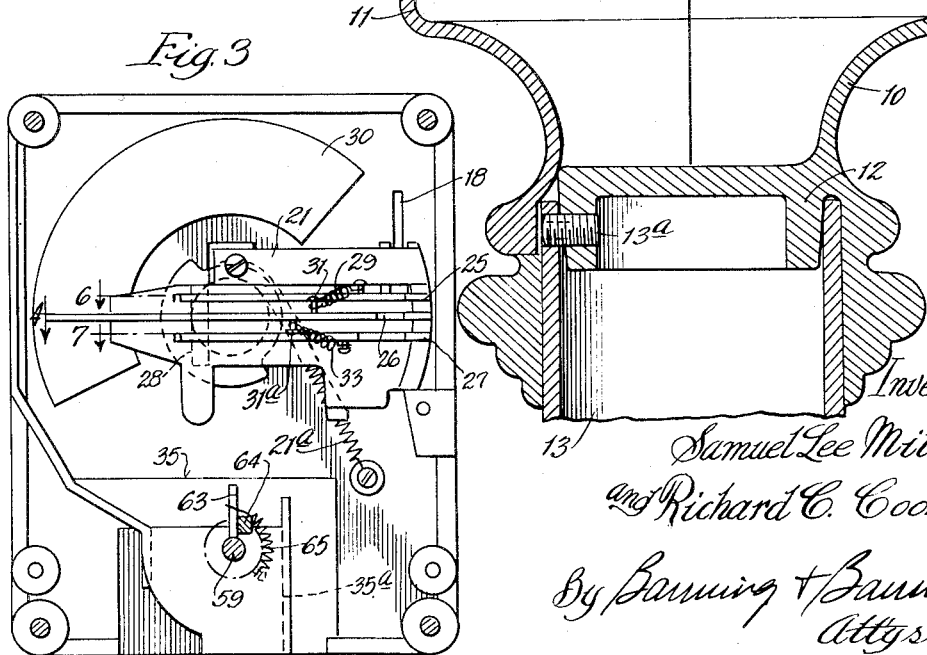
Inventors:
Samuel Lee Miller
and Richard C. Cook,
By Banning & Banning,
Attys.

Feb. 9, 1937.    S. L. MILLER ET AL    2,070,445
PARKING METER
Filed July 30, 1936    4 Sheets-Sheet 2
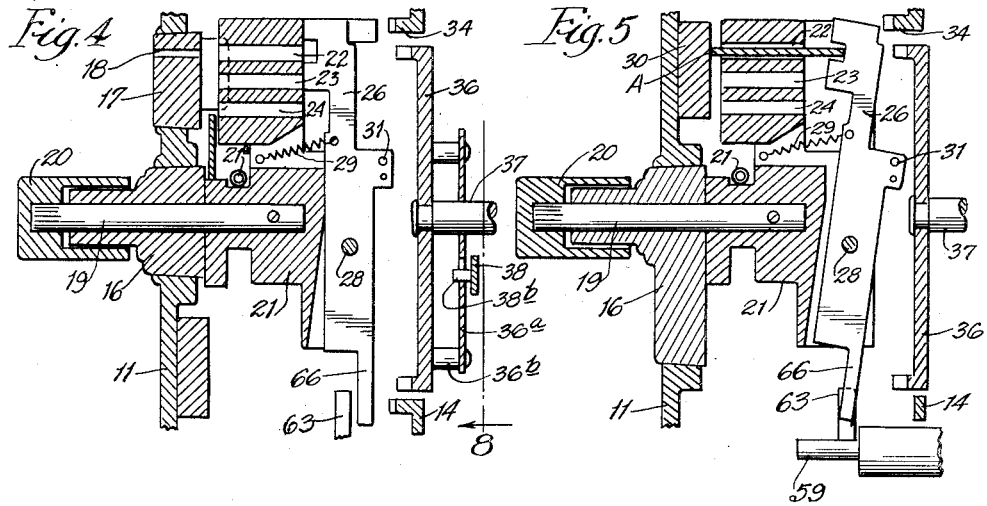
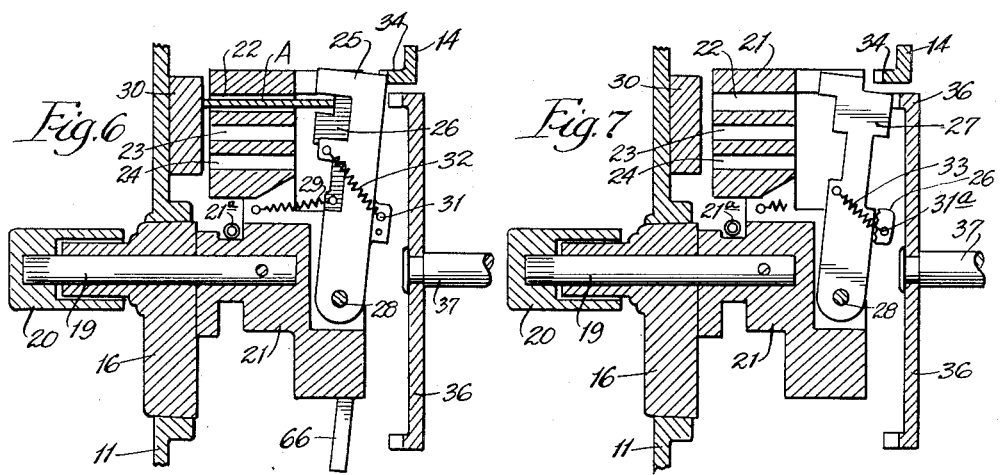
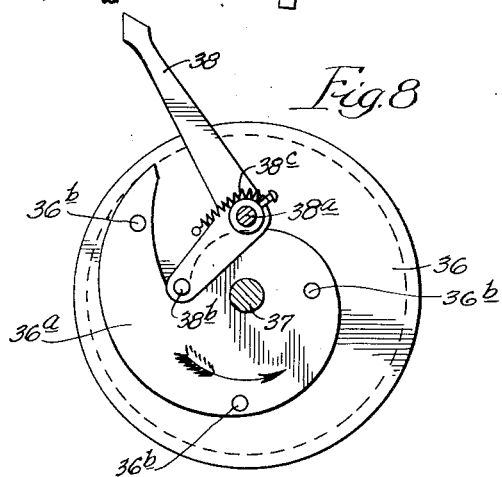
Inventors:
Samuel Lee Miller
and Richard C. Cook.
By Banning & Banning
Attys.

Feb. 9, 1937.  S. L. MILLER ET AL  2,070,445
PARKING METER
Filed July 30, 1936  4 Sheets-Sheet 3
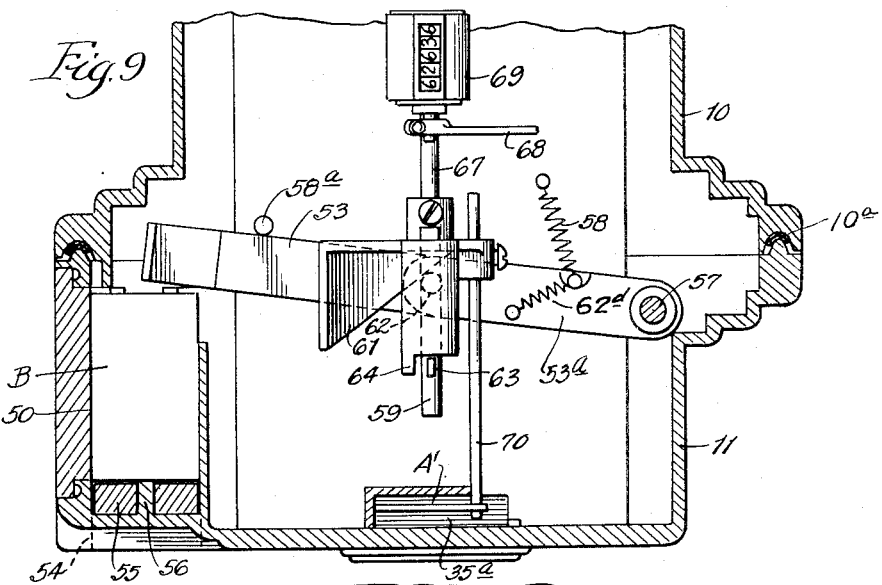
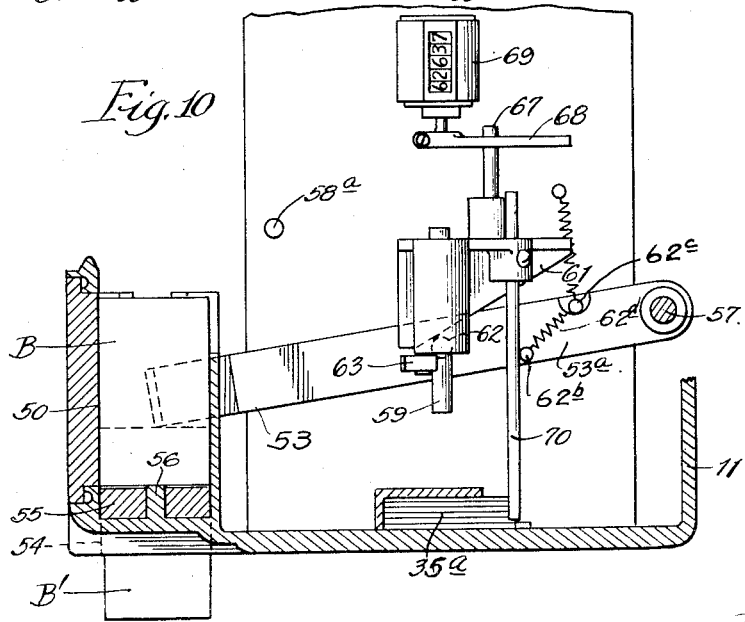
Inventors:
Samuel Lee Miller
and Richard C. Cook,
By Bunning & Bunning
Attys.

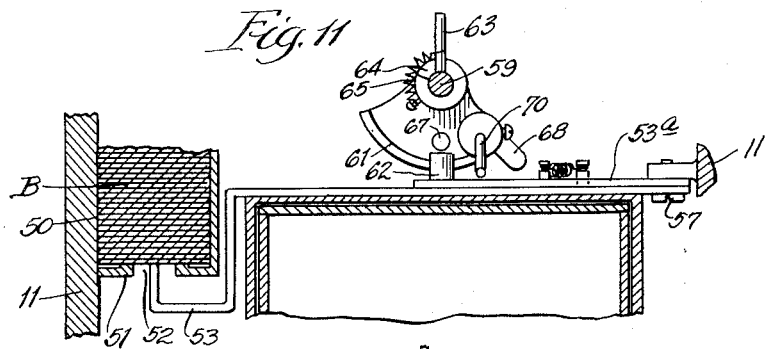
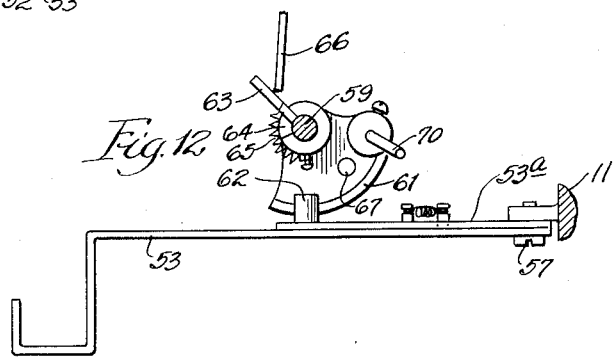
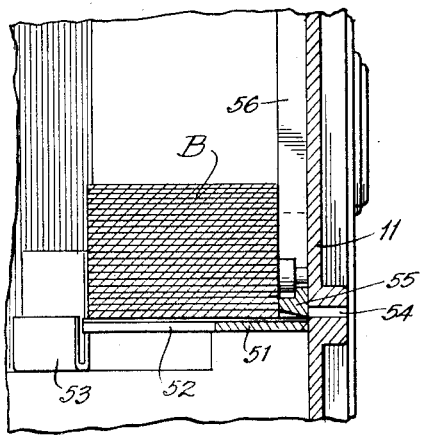
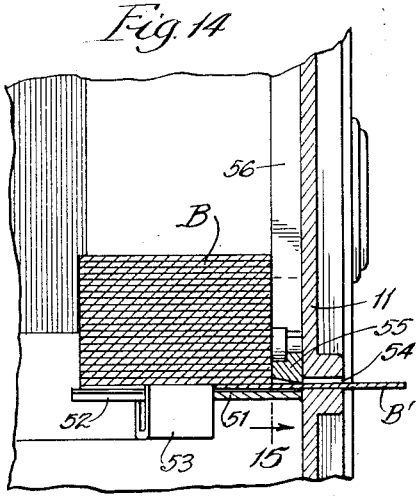
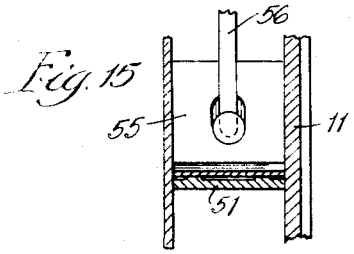

Patented Feb. 9, 1937

2,070,445

UNITED STATES PATENT OFFICE 2,070,445

PARKING METER

Samuel Lee Miller, Maywood, and Richard C. Cook, Chicago, Ill., assignors to Miller Meters Inc., Chicago, Ill., a corporation of Illinois Application July 30, 1936, Serial No. 93,356

4 Claims. (Cl. 194—72)

By a parking meter we mean a device for collecting a coin which is deposited by the user as a fee or service charge for the privilege of parking his automobile or other vehicle adjacent the device for a definite time period. Such meters are owned or controlled by the municipality.

An object of this invention is to provide a parking meter which upon the insertion and deposit of a coin will wind a clock-works mechanism for a predetermined time and exhibit an indicator during the same time during which an automobile may remain parked beside the meter, and at the time of the deposit of the coin the mechanism will issue a token serving as a receipt for the same.

Another object is to provide means for exhibiting the last coin deposited so as to prevent the likelihood of the insertion of a slug or the like instead of a coin and of means for releasing the previous coin upon the actuation of the mechanism upon the insertion of a next coin.

Another object is the provision of an improved coin-operating mechanism.

These and other objects accomplished by this invention which is fully described in the following specification and shown in the accompanying drawings in which:

Figure 1 is a front elevation showing the operating side of a parking meter embodying the invention;

Fig. 2 is a partial enlarged section on the broken line 2—2 of Fig. 1;

Fig. 3 is a partial vertical section on the broken line 3—3 of Fig. 2;

Fig. 4 is a partial horizontal section on the line 4 of Fig. 3 showing the coin operated mechanism for winding the clock with the parts in normal inoperative position;

Fig. 5 is a view of the same parts located substantially 90° from the position of Fig. 4;

Figs. 6 and 7 are views similar to Fig. 5 but with the sections taken on the lines 6 and 7 respectively of Fig. 3;

Fig. 8 is a partial section on the line 8 of Fig. 4 showing the connection to the time indicator;

Figs. 9 and 10 are partial horizontal sections on the line 9 of Fig. 2 showing the mechanism for feeding tokens and the counter mechanism;

Fig. 11 is a partial vertical section on the line 11 of Fig. 2 showing the token feeding mechanism in normal inoperative position;

Fig. 12 is a similar view showing the token feeding mechanism in operation;

Fig. 13 is a partial enlarged section on the line 13 of Fig. 1 through the token magazine;

Fig. 14 is a view similar to Fig. 13 showing the lowermost token being ejected; and Fig. 15 is a partial vertical section on the line 15 of Fig. 14.

The embodiment illustrated comprises a parking meter having a housing made up of two sections 10, 11 secured together in any manner as by means of screws (not shown). The section 10 has a lower portion 12 adapted to fit over a pipe 13 which serves as a standard or support, the lower end of which is secured to the ground in any desired manner. A headless screw 13ª passes through the upper end of the pipe and into the portion 12 and this is covered by the lower part of the housing section 11 so that the housing cannot readily be removed except by first removing the section 11. Rubber gaskets 10ª (Fig. 9) of rubber tubing separate the two sections so as to prevent the entrance of moisture.

A clock-works mechanism similar to that disclosed in the U. S. patent to Miller No. 1,799,056 granted March 31, 1931 is used in this parking meter and it has frame members 14, 15 (Fig. 2) which are secured to the housing by screws (not shown).

Referring now to Figs. 3 to 7, the front housing section 11 is provided with tapered openings in which are inserted tapered fillers 16, 17. These are removably secured in place in any desired manner. The latter contains a slot 18 through which a coin may be inserted as will later be described. The former is hollow and serves as a journal for operating a shaft 19 which has an operating lever or handle 20 rigidly secured thereto and extending on the outside of the housing. The inner end of the shaft 19 carries a block 21 corresponding to the block 33 of the above Miller patent. The block 21 is normally urged toward the position of Figs. 3 and 4 by a spring 21ª. This block is shown as having coin slots 22, 23, 24. Only the coin slot 22 is operative in the present instance for the reason that the filler 17 is provided with only one coin slot 18. If desired, however, fillers may be inserted having coin slots corresponding to any one of the coin slots 22, 23 or 24, to any two of them, or to all three. The method of operating coins of various sizes is fully set forth in the above Miller patent.

Referring now to Fig. 3, the block 21 is provided on its inner face with a series of parallel slots in which are located a safety pawl 25, a coin pawl 26, and a winding pawl 27 all of which are pivotally mounted on a pin 28 which extends through the block 21. These pawls are shown in detail in Figs. 4 to 7.

The coin pawl 26 is normally retained in the position shown in Fig. 4 by means of a spring 29 and is forced out of place by means of a coin A as shown in Fig. 5, when the coin is forced up on a cam 30 corresponding to the cam 30 of the above Miller patent due to the rotative movement of the block which is operated by the operating handle 20. The coin pawl 26 carries a pin 31. A tension spring 32 connects this pin with the safety pawl 25 and tends to hold the latter outwardly. The pin 31, however, serves to hold the safety pawl retracted when the coin pawl is also retracted as shown in Fig. 4. Similarly, the winding pawl 27 is pulled outwardly against the pin 31 by means of a spring 33.

Once the coin A is inserted and rides up on the cam 30, it causes the safety pawl 25 to engage a stationary, circular ratchet 34 which prevents the block 21 from being turned backward until it has completed its winding operation which will later be described, and the coin A has dropped off the end of the cam into the coin chute 35 (Fig. 2) therebeneath, at which time the coin will assume the position A' as will later be explained.

As the coin pawl 26 is lowered by a coin such as A to the position shown in Fig. 5, it also yieldably carries with it the winding pawl 27.

This pawl engages a ratchet wheel 36 on a shaft 37 corresponding to the ratchet wheel 31 and shaft 13 respectively of the above Miller patent. The winding pawl 27 having engaged the ratchet wheel 36 remains in engagement until the coin has moved past the cam 30 at which time the coin drops and the pawl is released. The shaft 37 winds a clock-works mechanism in the same way as that disclosed in the above Miller patent, and at the same time moves a pointer 38 (Fig. 1) to show the amount the clock has been wound.

This pointer 38 is pivotally mounted on a pin 38ª carried by the frame member 15, is held retracted by a spring 38ᶜ, and has a cam follower 38ᵇ riding on the spiral cam 36ª which is secured by studs 36ᵇ on the back of the ratchet wheel 36. The pointer indicates at all times the number of minutes which the mechanism has to go before it is run down, at which time the pointer reaches zero of the scale.

Thus it will be seen that we have provided a parking meter which can be set to run for a given period of time, say half an hour, on the deposit of a certain coin, as a nickel; that once the coin is inserted, and winding by means of the handle 20 is begun, it must continue until the coin is dropped, the winding mechanism being prevented from return to the starting position until it has completed its movement to the point where the coin is dropped.

At the time the winding is completed the pointer will move over so as to indicate the full time period for which the meter is to run. At the same time the clock will be started. As it runs down it will move the shaft 37 back to the zero or starting point, and as it does so the pointer will also move back to the zero position and the clock will stop when that position is reached. It is highly desirable that a receipt be issued to the person depositing a coin, and the mechanism for issuing such a receipt or token will now be described. This is shown in Figs. 2, and 9 to 15 inclusive. A magazine 50 is provided at one side of the housing section 11, and has a bottom 51 upon which rests a pile of tokens or receipts B which in this instance are preferably made of a cardboard of a desired thickness. In the bottom 51 is a slot 52 in which operates a finger 53 which is just high enough to catch the edge of the lowermost token B' (Fig. 14) and to shove it out through an opening 54 in the front of the section 11.

Before passing to the slot 54, however, the token B' encounters the sloping lower face of a shutter 55 which is guided by a central rib 56 which is preferably cast integral with the inner face of the section 11, and which serves to hold the pile of tokens in alignment. The shutter 55 serves to prevent anyone from inserting a hook or the like through the slot 54 for removing tokens.

The finger 53 is pivotally mounted on a screw 57 and is normally held in the position shown in Fig. 9 by means of a spring 58 against a pin 58ª.

For operating this finger we have provided a shaft 59 which is journaled at one end in the frame member 15 and at the other in a partition 60 which forms the sloping bottom of the coin chute 35. This shaft carries a circular cam 61 which has an inclined face bearing upon a pin 62 carried on the cushion lever 53ª which is also pivotally mounted on the screw 57 and carries a pin 62ᵇ which is yieldably connected to a pin 62ᶜ on the finger 53 by means of a spring 62ᵈ which is stronger than the spring 58. If the lowermost token sticks, the finger 53 yields, stretching the spring 62ᵈ and swinging with respect to the finger 53ª. Thus as the shaft 59 together with its cam 61 rotates as shown in Figs. 9 and 10, it causes the finger 53 to move from the normally retracted position of Fig. 9 to the advanced position of Fig. 10 wherein the token B' has been forced out through the slot so that it can be grasped and removed by the person operating the meter.

The shaft 59 carries a lug 63 (Fig. 3) and is normally held back against a stop 64 by means of a spring 65 (Figs. 11 and 12). An extension 66 on the coin pawl 26 is moved into the path of the lug 63 when a coin is inserted as shown in Fig. 5, but this extension lies to one side of the lug when no coin is inserted, as shown in Fig. 4. Thus, during the operation and winding the clock mechanism at extension 66 engages the lug 63, thereby moving the finger 53 so as to cause a token to be pushed part way through the token slot.

The cam 61 also carries a pin 67 which engages an arm 68 of a counter 69 so that each time a coin is used to operate the device, the counter will be actuated, thereby registering the number of coins inserted.

The cam 61 also carries a rod 70 which in the normal position of rest serves to partially close the bottom of a coin slot 35ª so that the coin A' as shown in Fig. 2 lies in front of a window which is closed by one or more pieces of glass 71. As the shaft rotates, however, the rod 70 moves to one side, thereby causing the coin A' to drop through an opening 72 into a double-walled coin box 73. Thus the last coin inserted is exposed to view so that the likelihood of the user inserting a slug or other spurious coin is reduced to a minimum.

The oscillation of the shaft 59 thus accomplishes three things. It drops the coin A' from in front of the window 71; it registers the insertion of another coin; and it pushes a token part way out of the meter so that it can be grasped and removed by the operator.

While we have shown and described the token as preferably a rectangular piece of cardboard or the like, it may be of metal or other material, and may assume any desired shape. This token may carry any desired legend, and while serving primarily as a receipt may also serve a number of other purposes. For example, it may have a definite value toward defraying the cost of a vehicle license for the following year in the city where the meter is in operation, or the city may credit a certain value for each token turned in on a community chest for public charities, or a merchant in that city may recognize each token as having a certain value in making purchases in his store. This mechanism for dispensing a token or receipt may be used on any coin-controlled device.

Thus it will be seen that we have provided a very simple and efficient parking meter and one which is capable of a great many uses. While we have shown but a single form of this meter, it will be understood that it is capable of many modifications and changes in the construction and arrangement which do not depart from the spirit of the invention as described in the appended claims.

We claim:

1. In a device of the class described, a timing mechanism, means operable by a coin for setting the timing mechanism to run a predetermined length of time, a magazine for holding a number of tokens, and means operable by the first mentioned means for issuing a token on each setting of the timing mechanism.

2. In a device of the class described, a timing mechanism, means operable by a coin for setting the timing mechanism to run a predetermined length of time, means for indicating when the time set on the timing mechanism has expired, a magazine for holding a number of tokens, and means operable by the first mentioned means for issuing a token on each setting of the timing mechanism.

3. In a device of the class described, a timing mechanism, means operable by a coin for setting the timing mechanism to run a predetermined length of time, means for indicating the time remaining for which the timing mechanism has been set, a magazine for holding a number of tokens, and means operable by the first mentioned means for issuing a token on each setting of the timing mechanism.

4. In a device of the class described, a timing mechanism, means operable by a coin for setting the timing mechanism to run a predetermined length of time, a magazine for holding a number of tokens, a visible coin chute, means operable by the first mentioned means for issuing a token and stopping the travel of the coin on which the token is issued, in said chute on each setting of the timing mechanism.

SAMUEL LEE MILLER.
RICHARD C. COOK.